(12) United States Patent
Takashima

(10) Patent No.: US 8,165,804 B2
(45) Date of Patent: Apr. 24, 2012

(54) NAVIGATION APPARATUS, METHOD, AND PROGRAM FOR SAME

(75) Inventor: Kenji Takashima, Obu (JP)

(73) Assignee: DENSO CORPORATION, Kariya (JP)

( * ) Notice: Subject to any disclaimer, the term of this patent is extended or adjusted under 35 U.S.C. 154(b) by 707 days.

(21) Appl. No.: 12/314,867

(22) Filed: Dec. 18, 2008

(65) Prior Publication Data

US 2009/0164117 A1  Jun. 25, 2009

(30) Foreign Application Priority Data

Dec. 19, 2007  (JP) ................................. 2007-327306

(51) Int. Cl.
*G01C 21/30* (2006.01)

(52) U.S. Cl. ........ 701/430; 701/412; 701/437; 701/463; 340/995.18; 340/995.17; 340/995.14

(58) Field of Classification Search .................. 701/200, 701/201, 207, 208, 209, 211, 213; 340/995.1, 340/995.12, 995.14, 995.17, 995.18, 995.19, 340/995.2

See application file for complete search history.

(56) References Cited

U.S. PATENT DOCUMENTS

| | | | | |
|---|---|---|---|---|
| 5,930,738 | A * | 7/1999 | Jones | 702/132 |
| 7,171,305 | B2 | 1/2007 | Minato et al. | |
| 7,584,025 | B2 * | 9/2009 | Tanaka | 701/1 |
| 7,912,513 | B2 * | 3/2011 | Tanaka et al. | 455/569.2 |
| 7,991,547 | B2 * | 8/2011 | Yoshida et al. | 701/208 |
| 8,009,063 | B2 * | 8/2011 | Terao et al. | 340/995.19 |
| 2008/0065323 | A1 | 3/2008 | Kobayashi et al. | |
| 2008/0221789 | A1 * | 9/2008 | Oono | 701/208 |
| 2009/0076724 | A1 * | 3/2009 | Kobayashi et al. | 701/209 |
| 2009/0082965 | A1 * | 3/2009 | Tanaka et al. | 701/213 |

FOREIGN PATENT DOCUMENTS

| | | |
|---|---|---|
| JP | A-9-159479 | 6/1997 |
| JP | A-11-72341 | 3/1999 |
| JP | A-2002-22480 | 1/2002 |

OTHER PUBLICATIONS

Office Action dated Nov. 4, 2010 issued in corresponding CN application No. 200810178081.9 (English translation enclosed).

* cited by examiner

*Primary Examiner* — Kaitlin Joerger
*Assistant Examiner* — Ernesto Suarez
(74) *Attorney, Agent, or Firm* — Posz Law Group, PLC

(57) ABSTRACT

A normal route guidance of a navigation apparatus based on guidance information retrieved from a hard disk drive is switched to a turn list display based on the guidance information from an external memory when a vehicle enters a high-altitude area. The navigation apparatus calculates a navigation route to a destination, and determines if the navigation route passes a high-altitude area. If the route passes the high-altitude area, the guidance information of a high-altitude area section of the navigation route is written in the eternal memory. Thus, while the vehicle is traveling, the navigation apparatus having the hard disk drive continues its navigation operation by displaying the turn list even when an operation of the hard disk drive is stopped due to a function restriction in the high-altitude area.

6 Claims, 7 Drawing Sheets

NAVIGATION APPARATUS, METHOD, AND PROGRAM FOR SAME

CROSS REFERENCE TO RELATED APPLICATION

The present application is based on and claims the benefit of priority of Japanese Patent Application No. 2007-327306 filed on Dec. 19, 2007, the disclosure of which is incorporated herein by reference.

FIELD OF THE INVENTION

The present disclosure generally relates to a navigation apparatus having a hard disk drive and a navigation program for use in a vehicle.

BACKGROUND INFORMATION

Conventionally, the navigation apparatus and other vehicular apparatuses use hard disk drive for storing map data, application programs and the like, and those apparatus access the hard disk drive for reading data therefrom. This is because the hard disk drive is convenient for storing a large volume of data, and, due to the variety of apparatuses used in the vehicle, not only the map data, but also music data, image data, movie data and the like can be conveniently stored in the hard disk drive for quick and easy retrieval.

The hard disk drive uses a magnetic head for reading and writing information on a disk shape storage medium that has a layer of magnetic material applied thereon. At the time of operation of the hard disk drive, the magnetic head located above a disk is raised therefrom by a pressure of air induced by the rotating disk by a small amount of distance. Therefore, a gap between the magnetic head and the rotating disk cannot be maintained in an appropriate condition due to a decrease of the air pressure for raising the magnetic head if the hard disk drive is operated in an environment where atmospheric pressure is extremely low. As a result, the magnetic head collides with the rotating disk to cause breakage of the disk. In other words, the hard disk drive has a restriction in terms of operational altitude due to the decrease of the atmospheric pressure in proportion to altitude increase. In general, the operation of the hard disk drive is guaranteed at an altitude of up to 3,000 meters to 5,000 meters (i.e., an altitude causing atmospheric pressure decrease down to 0.7 to 0.5).

Therefore, when the apparatus having the hard disk drive for use in a vehicle is brought to the high-altitude area that is higher than the operation guaranteed altitude of the hard disk drive, that is, a road at an altitude of 3,000, 4,000 or 5,000 meters, a disk breakage prevention measure is required.

A technique for coping with the problem of the hard disk drive caused by the travel of the vehicle in the high-altitude area is disclosed in, for example, a Japanese patent document JP-A-2004-317385 (U.S. Pat. No. 7,171,305). The technique in the above disclosure stores (i.e., copies) a part of the map data that is originally memorized on the hard disk drive to an external memory prior to stopping the operation of the hard disk drive when the vehicle reaches the high-altitude area at an altitude of a predetermined value or above (e.g., altitude of 3,000 meters or greater), and performs route guidance based on the map data stored in the external memory while the vehicle travels the high-altitude area above the predetermined altitude. The above technique prevents the breakage of the hard disk drive by stopping the hard disk operation in a travel of the high-altitude area, without disturbing continuation of the route guidance.

However, as disclosed in the above document, a large storage capacity must be reserved in a storage medium such as the external memory, because of the size of the map data used in the travel of the vehicle in the high-altitude area. Therefore, the navigation apparatus includes the storage medium having the large storage capacity, only to result in the price increase of the product, or alternatively, excludes the large storage medium to abandon the route guidance function in the high-altitude area during the operation stoppage of the hard disk drive.

As a result, the navigation apparatus loses its trust of the user by discontinuing the route guidance in the high-altitude area due to the non-operation of the hard disk drive leading to the loss of the required map data. That is, the restriction of the navigation function leads to the inconvenience of the user. In other words, avoiding the function restrictions caused by the non-operation of the hard disk drive in the high-altitude area without using the large storage medium has been the long-felt needs of the navigation apparatus and other apparatus using the hard disk drive as the data storage.

SUMMARY OF THE INVENTION

In view of the above and other problems, the present disclosure provides a route guidance provision scheme of a navigation apparatus and a navigation program that compensates function restrictions in a high-altitude area by reading required data from a memory or the like instead of a hard disk drive while a vehicle is traveling in the high-altitude area.

In an aspect of the present invention, the navigation apparatus uses a hard disk drive as map data storage, for calculation of a route toward a destination and for providing a route guidance based on the calculated route according to map data retrieved from the hard disk drive, by using a position detector for detecting a current vehicle position, and by stopping an operation of the hard disk drive upon determining that the current vehicle position is in a high-altitude area that is higher than a predetermined altitude based on a detection result of the position detector.

The navigation apparatus includes: an area data storage for, for use in a determination whether the current vehicle position is in the high-altitude area, storing high-altitude area determination data that defines, in a coordinate plane, the high-altitude area and a non-high-altitude area for both of map coordinates in the map data and position coordinates of the current vehicle position based on the detection result of the position detector; a list storage for storing a branch list data; a list generation unit for reading a list display data from the map data in the hard disk drive and storing the list display data in the list storage, in order to compare the route toward the destination with the high-altitude area determination data in the area data storage, and to retrieve, from the map data, the list display data for listing guidance information for a portion of the route that is at least in the high-altitude area in terms of branch points and inter-branch sections in the route arranged according to a travel sequence of the route; a high-alt area determination unit for determining whether or not the current vehicle position is in the high-altitude area based on a comparison of the position coordinates with the high-altitude area determination data; and a display control unit for displaying the branch list based on the branch list data stored in the list storage in place of providing the route guidance based on the map data retrieved from the hard disk drive while, in a course of route guidance toward the destination along the calculated route, the current vehicle position is determined to be in the high-altitude area by the high-alt area determination unit.

The high-altitude area defined by the predetermined altitude in the above description indicates, for example, a place having the maximum operational altitude (i.e., operation guaranteed altitude) of the hard disk drive. The maximum operational altitude may be interpreted as an altitude where the atmospheric pressure value comes down to the lower limit of the operational atmospheric pressure (i.e., operation guaranteed atmospheric pressure).

By using the above-described navigation apparatus for use in the vehicle, the function restrictions in the high-altitude area due to the operation prohibition of the hard disk drive are compensated by the branch list display according to the data pre-stored in the list storage in order to substitute the route guidance based on the map data retrieved on demand from the hard disk drive.

The branch list is a list of branches and inter-branch paths on the navigation route. That is, names of the branches, names of the inter-branch paths, travel directions at the branches, inter-branch distances and the like are displayed as information in a list format in an order of the travel sequence of the vehicle along the route. The branch list has a much smaller data volume in comparison to the data required for the route guidance that uses map display, intersection close-up images, and the like. Therefore, a required volume of the storage medium for storing the branch list becomes much smaller in comparison to the required storage volume for storing the map data, thereby resulting in only a nominal cost increase when the branch list display function of the present invention is added to an existing system. That is, the user's convenience is greatly improved with a nominal production cost increase in terms of continuity of the navigation function along the navigation route.

BRIEF DESCRIPTION OF THE DRAWINGS

Other objects, features and advantages of the present invention will become more apparent from the following detailed description made with reference to the accompanying drawings, in which.

DETAILED DESCRIPTION

Hereafter, embodiments of the present invention are described with reference to the drawings.

1. Explanation of Composition of Vehicle Navigation Device

Figure 1:
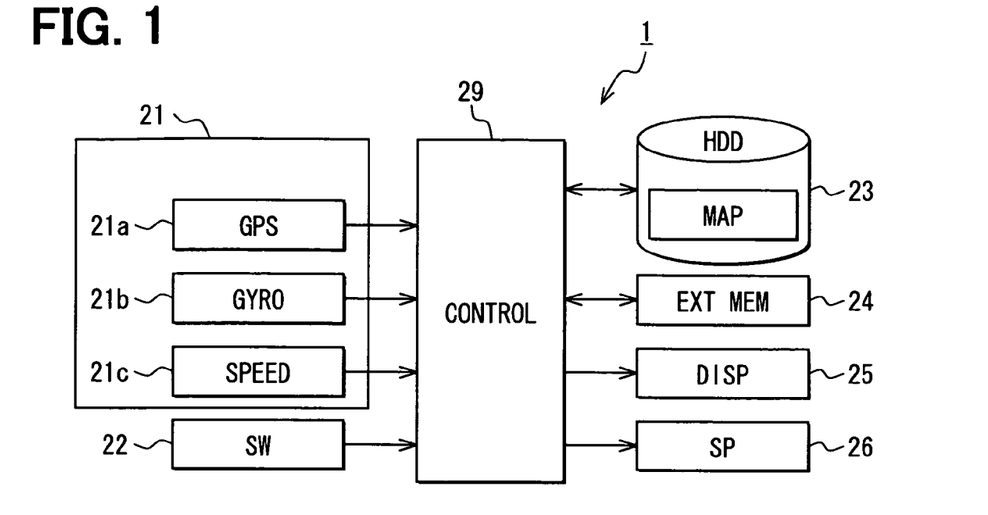
FIG. 1 is a block diagram of an outline configuration of a vehicle navigation apparatus.

FIG. 1 is a block diagram of an outline configuration of a vehicle navigation apparatus 1.

The vehicle navigation apparatus 1 includes, as shown in FIG. 1: a position detector 21 for detecting a current position of a vehicle; an operation switch group 22 for receiving various inputs from a user; a hard disk drive (HDD) 23 for storing map data, a program, and the like as a large volume storage; an external memory 24 for storing various kinds of information; a display unit 25 for displaying various images including a map display screen and the like; a voice output unit 26 for outputting various guidance voice and the like; and a control unit 29.

The position sensor 21 includes a GPS receiver 21a that receives a GPS signal from a GPS satellite through a GPS antenna and detects position coordinates of the vehicle, a gyroscope 21b that outputs a detection signal of an angular velocity of rotary motion being applied to the vehicle, and a speed sensor 21c that outputs a detection signal of vehicle speed. These sensors 21a to 21c yields errors of respectively different natures, and those errors are compensated with each other by employing data from different sensors.

The operation switch group 22 is provided as a touch panel that is integrally formed on a display screen of the display unit 25 and/or mechanical key switches disposed around the display unit 25.

The hard disk drive (HDD) 23 is a combination of components such as a hard disk for storing information and a controller that includes a magnetic head to read and write information from/to the hard disk, a drive unit, a control unit and the like. The HDD 23 reads data from the hard disk under control of the control unit 29 to feed data to the control unit 29. Data stored on the HDD 23 includes road data including node/link information, map data for drawing a map on the screen, data for map matching, data for route search and guidance, a program for an operation of the navigation apparatus 1, and other data such a design image and the like. In addition, the HDD 23 is assumed to be operated at an altitude of 5,000 meters or lower, or an atmospheric pressure of 0.5 or above (operation guarantee condition).

The external memory 24 is used for storing high-altitude area data, turn list data (equivalent of the branch list data in claim language: mentioned later in detail), design image data for drawing the turn list and other kinds of data. The external memory 24 may be consisted of a storage device such as, for example, a non-volatile semiconductor memory which is capable of re-writing memory contents electrically or magnetically, and is capable of maintaining memory contents even when an electric power supply is terminated.

Figure 2A:
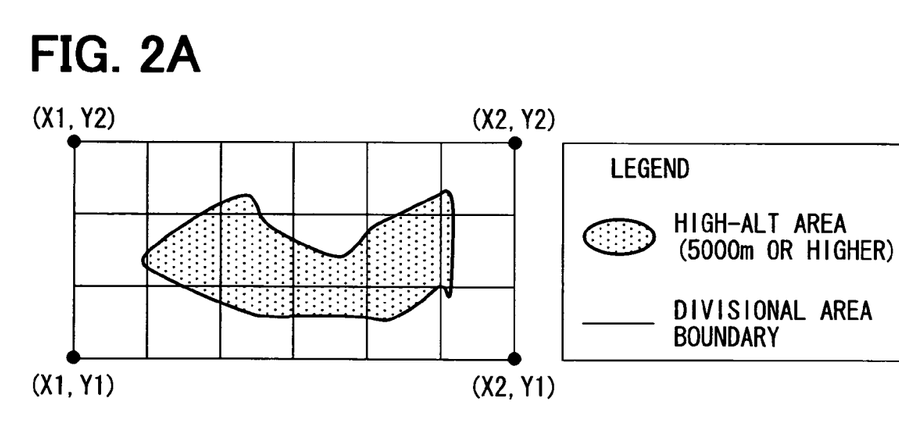
FIGS. 2A and 2B are illustrations showing an outline of high-altitude area data.
Figure 2B:
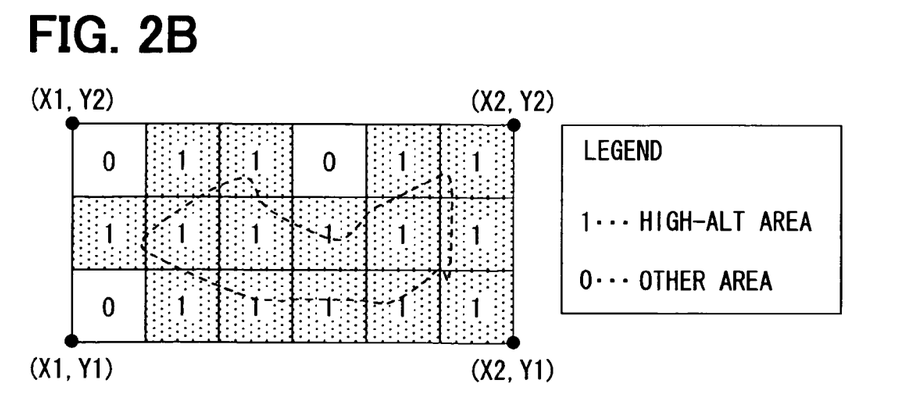

Here, the high-altitude area data is described on the basis of FIG. 2. FIGS. 2A and 2B are illustrations showing an outline of high-altitude area data. The high-altitude area data is data that has area codes for distinguishing a high-altitude area and a non high-altitude area. The area codes are assigned to each of the blocks in a meshed coordinate plane in the map, that is, each of the blocks divided by longitudinal lines and latitudinal lines of a predetermined interval.

For instance, it is assumed that, as shown in FIG. 2A, there is a high-altitude area of 5,000 meter or more at the center of the map coordinate plane that is defined by four corners having the coordinates of (X1, Y1), (X2, Y1), (X1, Y2), and (X2, Y2), where Xn and Yn respectively representing a latitude coordinate and a longitude coordinate. When the high-altitude area data is generated corresponding to the above map coordinate area, the division areas (e.g., the blocks) are defined by dividing the above map coordinate area. That is, an area code of "1" is assigned to a division area where at least a part of the division area has the high-altitude area of 5,000 meters or higher altitude as shown in FIG. 2B. On the other hand, also shown in FIG. 2B, an area code of "0" is assigned to a divisional area that does not have the high-altitude area included in the block. The high-altitude area data thus defined is stored in the external memory 24 as table data for each of the division areas of the map coordinate plane (for the entire coordinate plane or for a part of the plane) that is retrieved from the HDD 23.

The rest of the components in FIG. 1 are described in the following. The display unit 25 is a color display device having the display screen of liquid crystal display unit or the like. The display unit 25 is capable of displaying various images on the display screen depending on the input of the video signal from the control unit 29. For example, the image on the display screen may have a current position marking on the map specified by both of the current position of the vehicle from the position sensor 21 and the map data from the HDD 23, together with a guidance route to the destination, land names, signs, and other information such as landmarks or the like added thereon.

The voice output unit 26 is a device capable of notifying the user of various information by using a sound. The sound from the voice output unit 26 in combination with the display on the display unit 25 provides the user with various guidance such as a route guidance and the like.

The control unit 29 is a well-known device such as a microcomputer including a CPU, a ROM, a RAM, an I/O and a bus line connecting these devices for providing control for each of the above components. The control unit 29 carries out various kinds of processing according to the application program and data retrieved from the ROM, the HDD 23, and the external memory 24 or the like.

For example, the navigation-related processing includes map display processing, route guidance processing and the like. As for the map display processing, the current position of the vehicle is calculated based on each of the detection signals from the position sensor 21 and the map of a current position neighborhood read from the HDD 23 are displayed on the display unit 25. As for the route guidance processing, the guidance route is calculated as an optimum route from the current position to the destination based on the location data stored on the HDD 23 and the destination according to instructions from the operation switch group 22 or the like, for the purpose of navigating the vehicle, in consideration of the relation between the current position and the destination. As a technique to automatically set the optimum route, cost estimation technique by Dijkstra method or the like is known among other methods.

Further, the navigation apparatus 1 is expected to be used in an area with an altitude that exceeds an upper limit altitude of a normal operation of the HDD 23 (i.e., an operation guarantee altitude of the HDD 23). The upper limit altitude may be 5,000 meters in this case. Therefore, when the vehicle enters the high-altitude area, the control unit 29 prohibits the hard disk drive operation in the high-altitude area exceeding the altitude of 5,000 meters in order to prevent breakage of the HDD 23 due to its operation.

When the operation of the HDD 23 is prohibited in the high-altitude area, the data required for map display and/or route guidance can not be read from the HDD 23. As a result, the map display and the route guidance in a normal operation scheme can not be continued while the vehicle is traveling in the high-altitude area. However, while the vehicle is in the high-altitude area, the control unit 29 displays, as an alternative for the normal map-display/guidance operation, guidance information regarding branch points and paths between the branch points on the navigation route toward the destination as a turn list, which serves as one of the advantageous features of the present invention. That is, the turn list provides information on the branch points and the inter-branch paths in a list form in a traveling order of the navigation route toward the destination.

Figure 3:
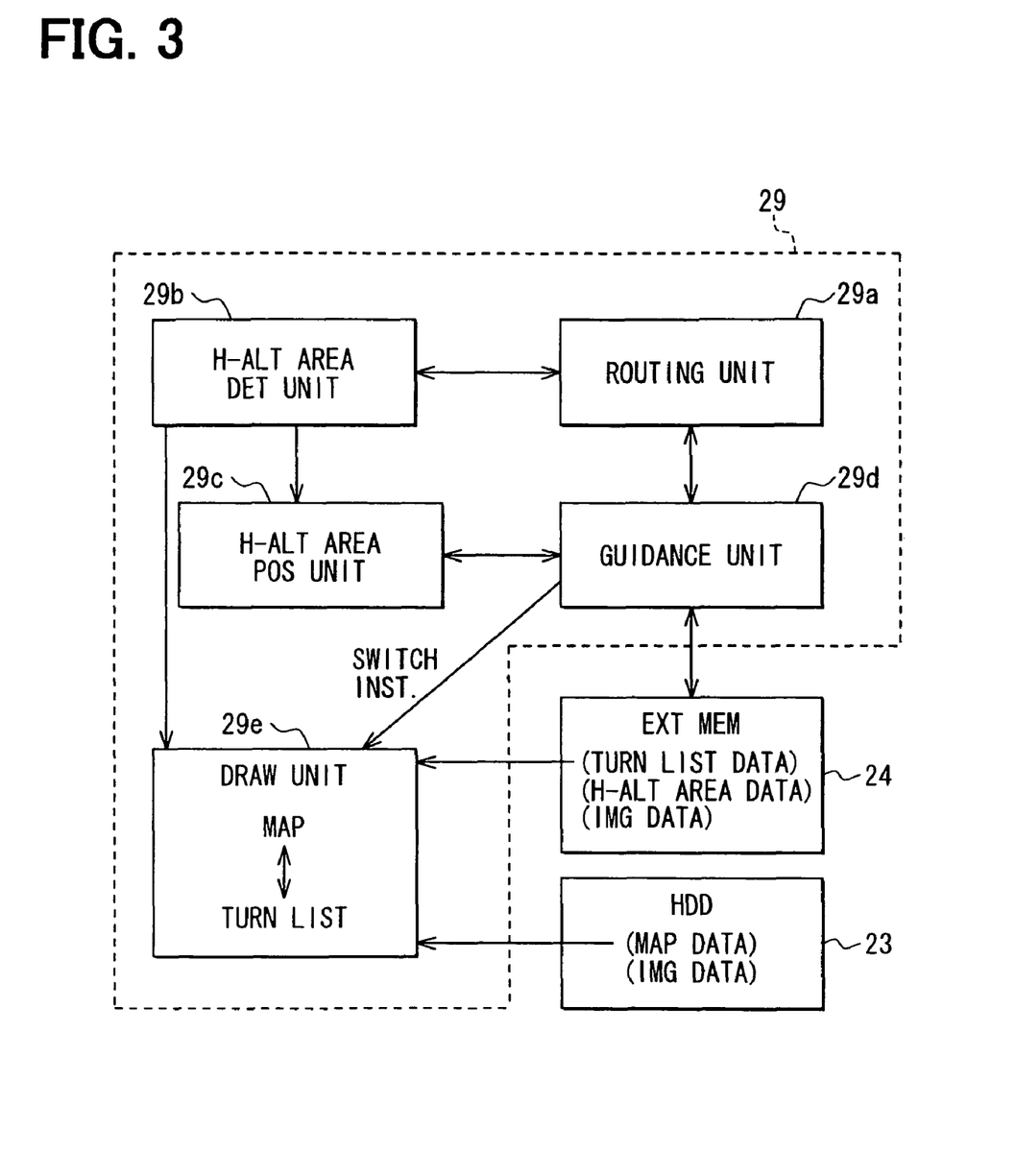
FIG. 3 is a block diagram showing a correlation of various functions for displaying a turn list.

FIG. 3 is a block diagram showing a correlation of various functions for displaying the turn list. The control unit 29 has, as function units for turn list display in the high-altitude area, a routing unit 29a, a high-altitude area determination unit 29b, a high-altitude area positioning unit 29c, a guidance unit 29d, and a draw unit 29e, as shown in FIG. 3.

Among those function units, the routing unit 29a writes, to the external memory 24, guidance data regarding the branch points and paths in sections of the navigation route that pass in the high-altitude area, when the calculated navigation route according to the user input includes the high-altitude area passing sections. The guidance data writing to the memory 24 is designated as "routing processing" (described later in detail). The high-altitude area determination unit 29b provides a function of, by comparing the navigation route calculated by the routing unit 29a and the high-altitude area data, determining whether or not the navigation route passes the high-altitude area.

The high-altitude area positioning unit 29c determines whether the vehicle has passed a certain branch point based on the current position detection result of the position detector 21 while the vehicle is traveling in the high-altitude area.

The guidance unit 29d executes "Guidance processing," "Guidance switch processing," and "Turn list display processing." In the "Guidance processing," the turn list data is generated and is written to the external memory 24, or the normal route guidance is provided without generating the turn list data, depending on whether or not the navigation route toward the destination passes the high-altitude area. In the "Guidance switch processing," the normal map display/guidance is switched to the turn list display when the vehicle enters the high-altitude area from an outside of the high-altitude area while traveling on the navigation route. In the "Turn list display processing," the turn list is displayed based on the turn list data stored in advance in the external memory 24.

The draw unit 29e displays the map and/or the guidance image based on the map data and the design image data read from the HDD 23 while the vehicle is traveling outside of the high-altitude area as the normal operation scheme, and displays the turn list based on the turn list data and the design image data read from the external memory 24 while the vehicle is traveling in the high-altitude area.

Details of the above-described processing are described later in the description of the embodiment.

The correspondence of the components of the vehicle navigation apparatus 1 in the present embodiment and the elements in claim language is indicated in the following. That is, the position detector 21 of the vehicle navigation apparatus 1 in the present embodiment corresponds to the position detector in claims. Further, the external memory 24 corresponds to the area data storage and the list storage. Further, the display unit 25 corresponds to the notification unit. Further, the operation switch group 22 corresponds to the input unit. Further, the control unit 29 corresponds to the high-alt area determination unit and the display control unit.

2. Explanation of Each Processing Executed by the Control Unit

Details of various processing that the control unit 29 executes are described with reference to flow charts in FIGS. 4 to 8 and 10, and illustrations of FIGS. 9 and 11.

2-1. Explanation of Main Processing

Figure 4:
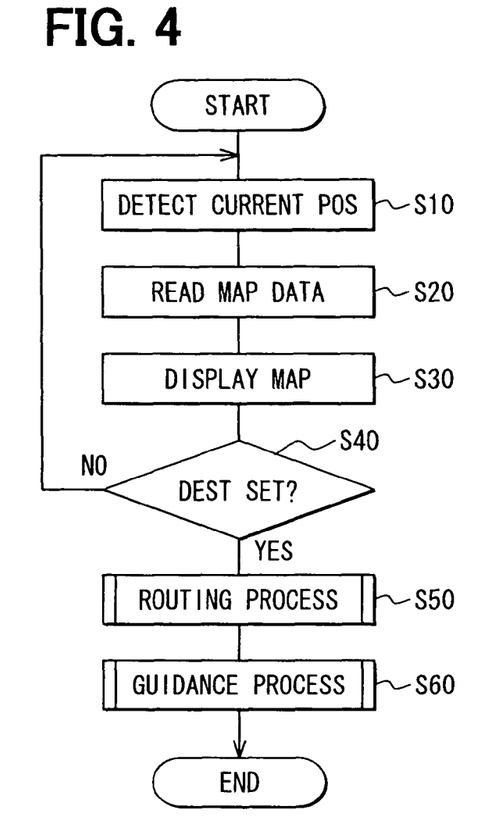
FIG. 4 is a flow chart showing a procedure of route guidance processing.

FIG. 4 is a flow chart showing a procedure of route guidance processing, that is, a main processing performed by the control unit 29 of the navigation apparatus 1. The main processing of the route guidance is started when the power supply of the vehicle navigation apparatus 1 is turned on.

First, the control unit 29 detects the current position in the vehicle on the basis of the input signal from the position detector 21 (S10). Next, the map data around the current position is read from the HDD 23 (S20). Then, the screen that represents the map around the current position and a mark showing the current position superposed thereon is displayed on the display unit 25 (S30).

After displaying the map around the current position, it is determined whether the destination has been set by the user's operation (S40). If the destination has not been set (S40:NO), the process returns to S10. If the destination has been set (S40:YES), the "Routing processing" that calculates the route from the current position to the destination is executed (S50). Details of the "Routing processing" is described later. The route guidance is provided along the route to the destination after the "Routing processing" is executed, and the "Guidance processing" that displays the turn list in the high-altitude area is executed (S60) together with the "Routing processing." Details of the "Guidance processing" are described later.

2-2. Explanation of "Routing Processing"

Figure 5:
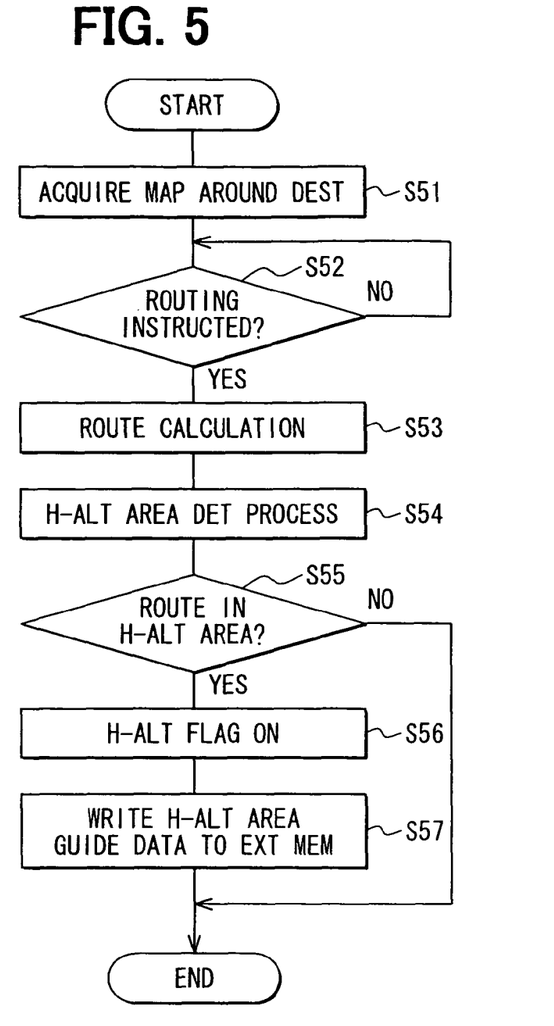
FIG. 5 is a flow chart showing a procedure of routing processing.

FIG. 5 is a flow chart showing a procedure of the "Routing processing." The "Routing processing" is processing executed in S50 of the main processing mentioned above (See FIG. 4).

First, the control unit 29 acquires the map data around the set destination from the HDD 23 (S51). Then, it is determined whether the instruction from the user to begin the route calculation has been input (S52). While the user's instruction has not been input (S52:NO), the process repeats S52. When the instruction from the user is determined to be input (S52:YES), based on the map data specifying location points and the set destination, the process performs the route calculation for yielding the best route from the current position to the destination (S53).

Then, the process performs high-altitude area determination processing, that is, whether the calculated route passes the high-altitude area is determined based on a comparison between the calculated route toward the destination and the high-altitude area data stored in the external memory 24 (S54). If the process determines that the route does not pass the high-altitude area (S55:NO), the "Routing processing" is ended as a result of the determination processing.

On the other hand, if the process determines that the route passes the high-altitude area (S55:YES), a high-altitude flag is turned on for showing that the route passes the high-altitude area (S56). Then, the guidance data concerning the branch points and the paths between branch points included in the route section that passes the high-altitude area in the route toward the destination is acquired from the map data on the HDD 23, and the data is written in the external memory 24 (S57). The guidance data acquired from the map data includes, for example, data that shows branch point coordinates, names of the branch points and inter-branch paths, distances between branch points and the like.

2-3. Explanation of "Guidance Processing"

Figure 6:
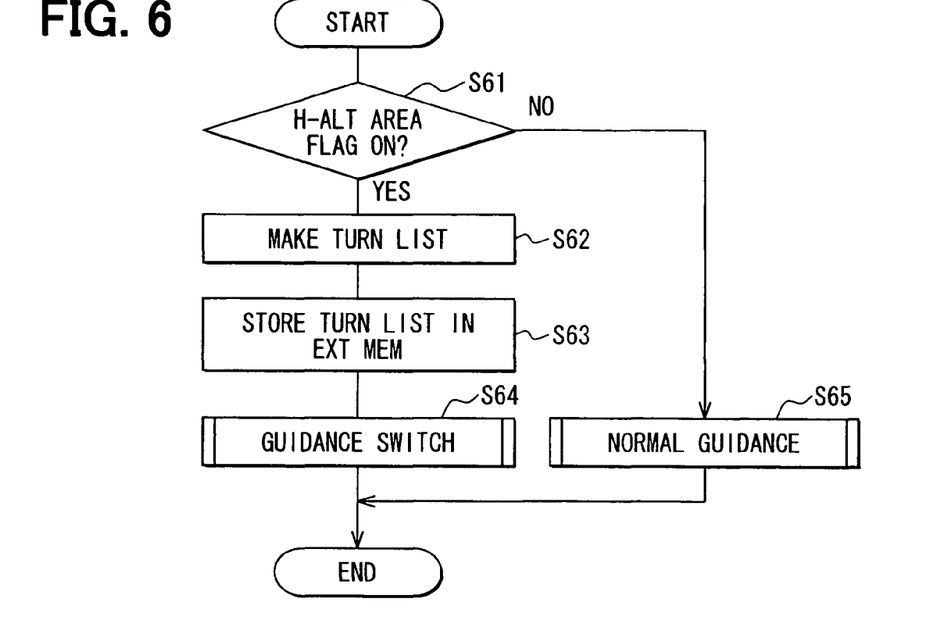
FIG. 6 is a flow chart showing a procedure of guidance processing.

FIG. 6 is a flow chart showing a procedure of the "Guidance processing." The "Guidance processing" is processing executed in S60 of the main processing mentioned above (See FIG. 4).

The control unit 29 firstly determines whether the high-altitude area flag is turned on (S61). If the high-altitude area flag is being turned on (S61:YES), the process generates the turn list data to display the turn list that shows guide information on the branch points and inter-branch paths along the route in a traveling order based on the guidance data memorized in the external memory 24 as well as the route toward the destination (S62). The turn list data is generated by adding information on the traveling direction at the branch point and the route from the starting point to the destination to the information that is already acquired from the HDD 23 regarding the guidance data of the branch points and the inter-branch paths in accordance with the calculated route.

After the turn list data is generated, the process writes the data in the external memory 24 (S63), and starts the "Guidance switch processing" (S64). In the "Guidance switch processing," a normal route guidance is provided along the calculated route toward the destination by displaying the map and outputting the guidance voice while the vehicle is traveling outside of the high-altitude area. On the other hand, when the vehicle enters the high-altitude area, the process switches from the normal route guidance to the turn list display, and continues to display the turn list until the vehicle exits from the high-altitude area, or until the vehicle reaches the destination. Details of the "Guidance switch processing" are described later.

On the other hand, if, in S61, the control unit 29 determines that the high-altitude area flag is being turned off (S61:NO), the normal route guidance for providing the map display and guidance voice along the route (i.e., Normal guidance processing) is started (S65). In the "Normal guidance processing," the map data, the design image data and the like necessary for the route guidance are read from the HDD 23 on demand for the execution of the processing. Because the "Normal guidance processing" is similar to the conventional route guidance, a detailed explanation is omitted from the description of the present embodiment.

2-4. A. Explanation of "Guidance Switch Processing (First Embodiment)"

Figure 7:
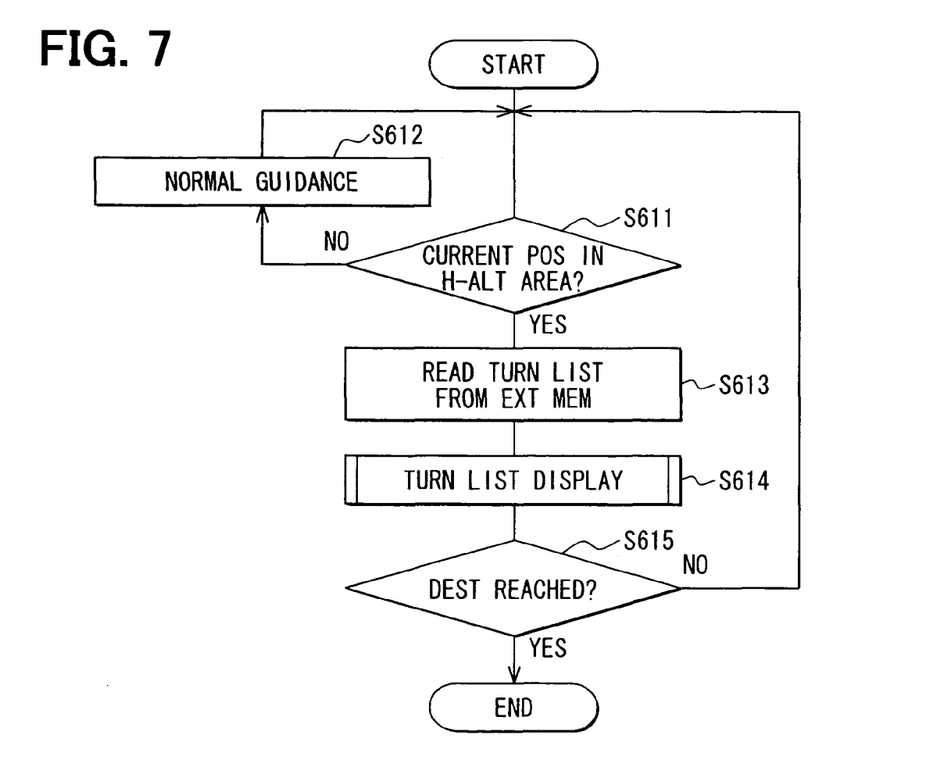
FIG. 7 is a flow chart showing a procedure of guidance switch processing in a first embodiment of the present invention.

FIG. 7 is a flow chart showing a procedure of "Guidance switch processing" in a first embodiment of the present invention. The "Guidance switch processing" is processing executed in S64 of the above-mentioned "Guidance processing" (See FIG. 6).

The control unit 29 firstly determines, based on the input signal from the position detector 21 and based on a comparison of the signal with the high-altitude area data, whether the current position is included in the high-altitude area (S611). If the process determines that the current position is not included in the high-altitude area (S611:NO), the process returns to S611 with the above-mentioned "Normal guidance processing" being executed (S612).

On the other hand, if the process determines that the current position is included in the high-altitude area (S611:YES), the process interrupts the "Normal guidance processing," and reads the turn list data memorized in the external memory 24 to the work memory in the control unit 29 (S613). Then, the process switches to the execution of "Turn list display processing" that displays the turn list on the display unit 25 on the basis of the data stored in the external memory 24 (S614). Details of the "Turn list display processing" are described later. In addition, the operation of the HDD 23 is prohibited when it is determined that the vehicle has entered the high-altitude area.

It is determined whether the vehicle ahs arrived to the destination on the basis of the input signal from the position detector 21 after executing the "Turn list display processing" (S615). If the process determines that the vehicle has not reached the destination (S615:NO), the process returns to S611. On the other hand, if the process determines that the vehicle has arrived to the destination (S615:YES), the "Guidance switch processing (First embodiment)" is ended.

2-4. B. Explanation of "Guidance Switch Processing (Second Embodiment)"

Figure 8:
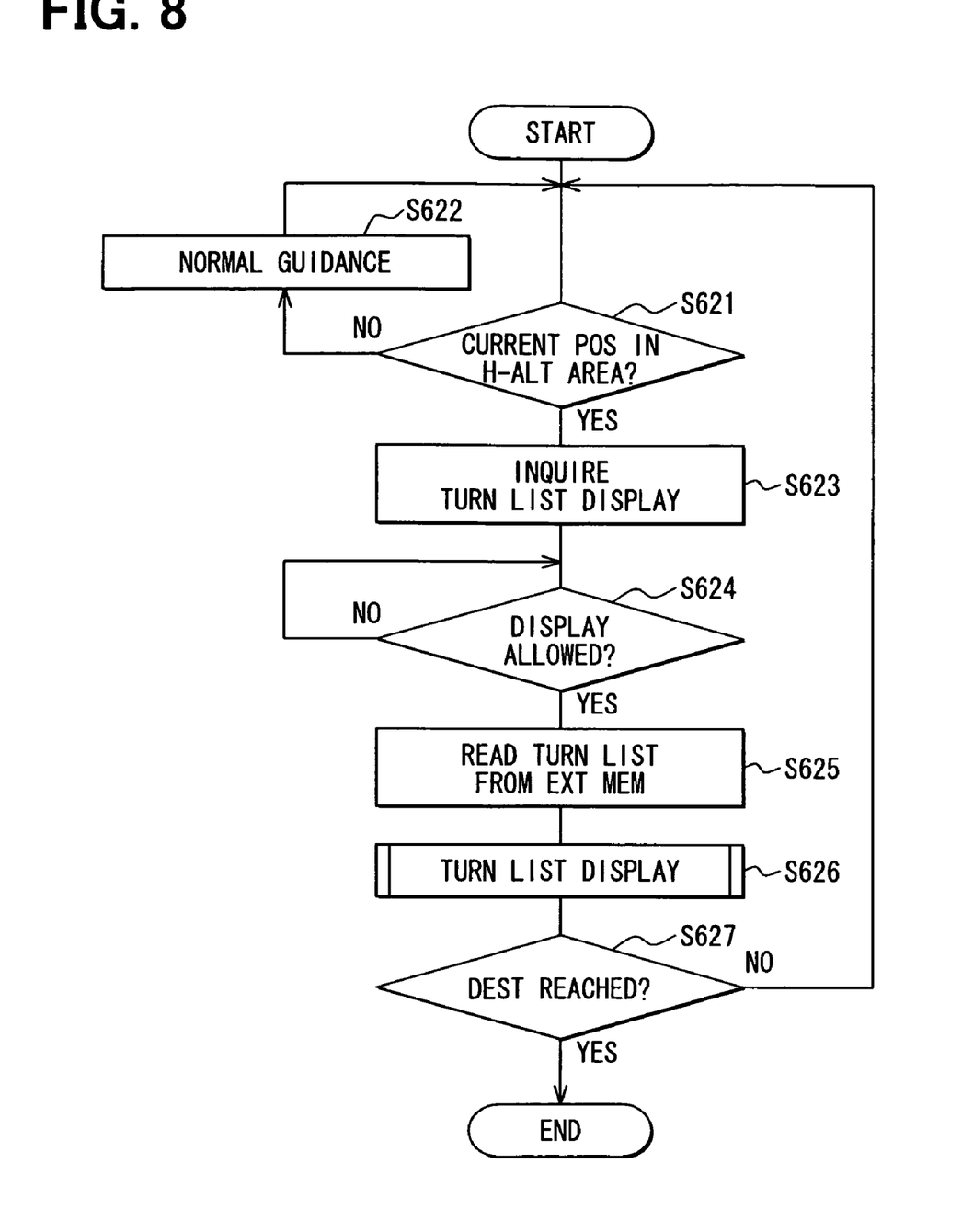
FIG. 8 is a flow chart showing a procedure of guidance switch processing in a second embodiment of present invention.

FIG. 8 is a flow chart showing a procedure of "Guidance switch processing" in a second embodiment of the present invention.

The "Guidance switch processing" is processing executed in S64 of the above-mentioned "Guidance processing" (See FIG. 6).

The control unit 29 firstly determines, based on the input signal from the position detector 21 and based on a comparison of the signal with the high-altitude area data, whether the current position is included in the high-altitude area (S621). If the process determines that the current position is not included in the high-altitude area (S621:NO), the process returns to S621 with the above-mentioned "Normal guidance processing" being executed (S622).

On the other hand, if the process determines that the current position is included in the high-altitude area (S621:YES), the process interrupts the "Normal guidance processing," and displays, on the display unit 25, an inquiry message (FIG. 9) that inquires the user whether or not the turn list is displayed (S623). In addition, the operation of the HDD 23 is prohibited when it is determined that the vehicle has entered the high-altitude area.

The specific contents of the message displayed in S623 are described with reference to FIG. 9. FIG. 9 is an illustration showing an example of a message for inquiring a display of the turn list.

Figure 9:
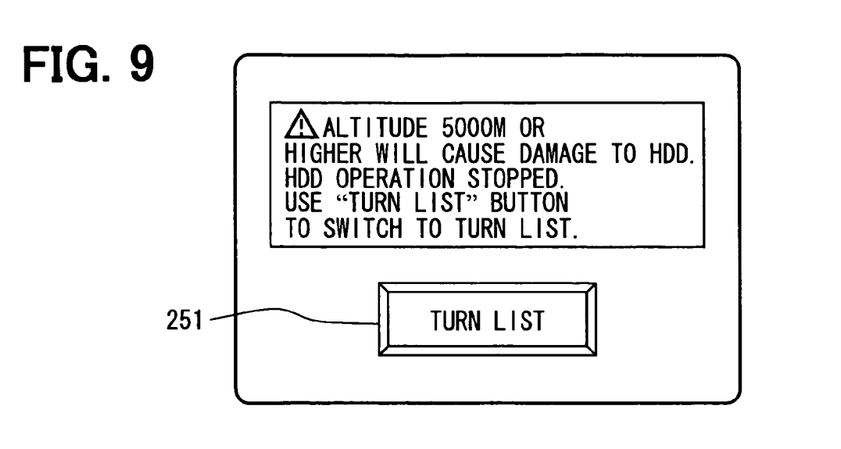
FIG. 9 is an illustration showing an example of a message for inquiring a display of the turn list.

As shown in FIG. 9, the message on the screen notifies the user that the map cannot be displayed while the vehicle is in the high-altitude area due to the prohibition of the HDD operation. The message also notifies the user that the operation of Turn List button is encouraged to switch to the turn list display. The Turn List button 251 for starting the turn list display is displayed on the screen as a GUI icon. For starting the turn list display, the user presses the button 251 as an instruction to start the turn list display.

Now the explanation goes back to the flow chart in FIG. 8. After the message to inquire the display of the turn list in S623 is displayed, the process waits for the input of the instruction that allows the display of the turn list (S624). When it is determined that the instruction for allowing the turn list display is input (S624:YES), the process reads the turn list data from the external memory 24 to the work memory in the control unit 29 (S625). Then, the process executes the "Turn list display processing" that displays the turn list on the display unit 25 on the basis of the data stored in the external memory 24 (S626). Details of the "Turn list display processing" are described later.

After the execution of the "Turn list display processing," it is determined whether the vehicle has reached the destination on the basis of the input signal from the position detector 21 (S627). If the process determines that the vehicle has not reached the destination (S627:NO), the process returns to S621. If the process determines that the vehicle has reached the destination (S627:YES), the "Guidance switch processing (Second embodiment)" is ended.

2-5. Explanation of "Turn List Display Processing"

Figure 10:
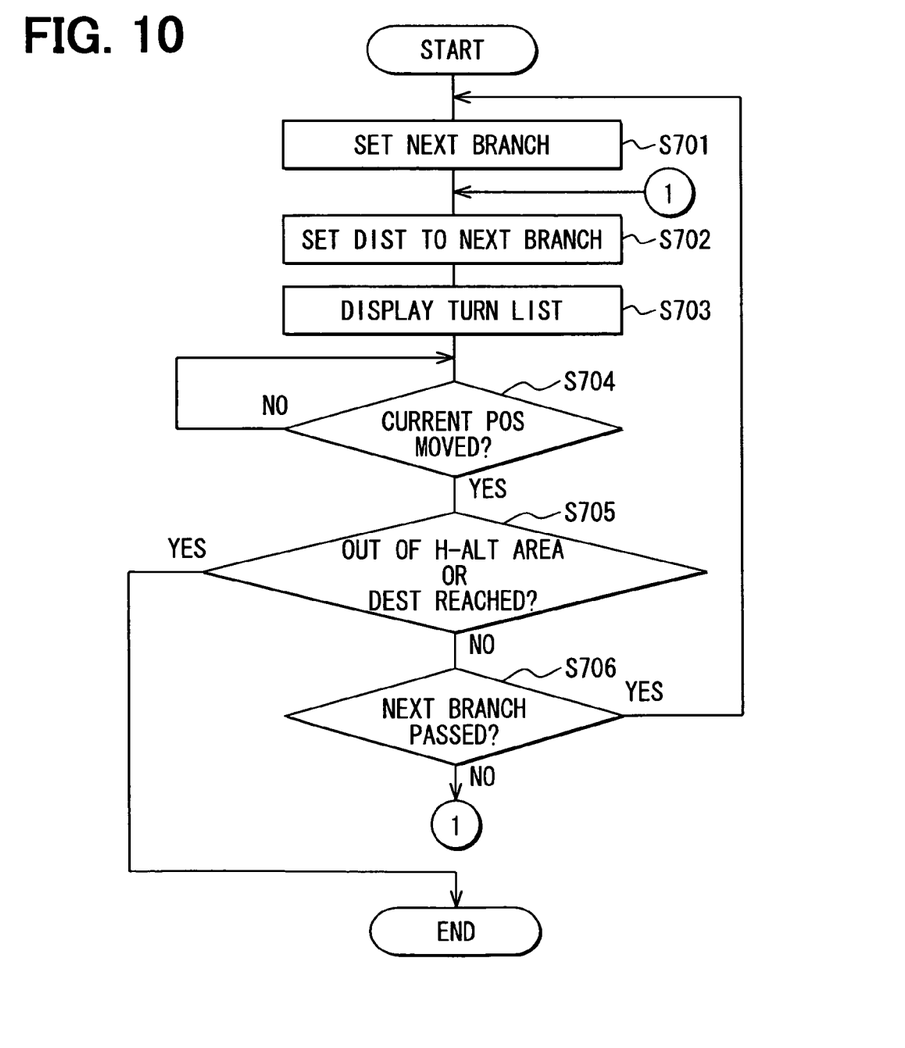
FIG. 10 is a flow chart showing a procedure of turn list display processing.

FIG. 10 is a flow chart showing a procedure of turn list display processing. The "Turn list display processing" is processing executed in S614 and S626 of the above-mentioned "Guidance switch processing (First and second embodiments)" (See FIGS. 7 and 8).

The control unit 29 first sets, from the turn list data stored in the work memory, the data of the branch point to be passed subsequently in the travel of the vehicle (S701). Then, based on the data concerning the route in the turn list data, the distance from the current position to the following branch point is calculated and the calculated distance is set in the data (S702). Then, the turn list that uses the current position as a start point is displayed on the display unit 25 on the basis of the data set in S701 and S702, the turn list data stored in the work memory, the design image data and the like memorized in the external memory 24 (S703).

The specific contents of the turn list displayed in S703 are described with reference to FIG. 11. FIG. 11 is an illustration of an example of the display of the turn list.

Figure 11:
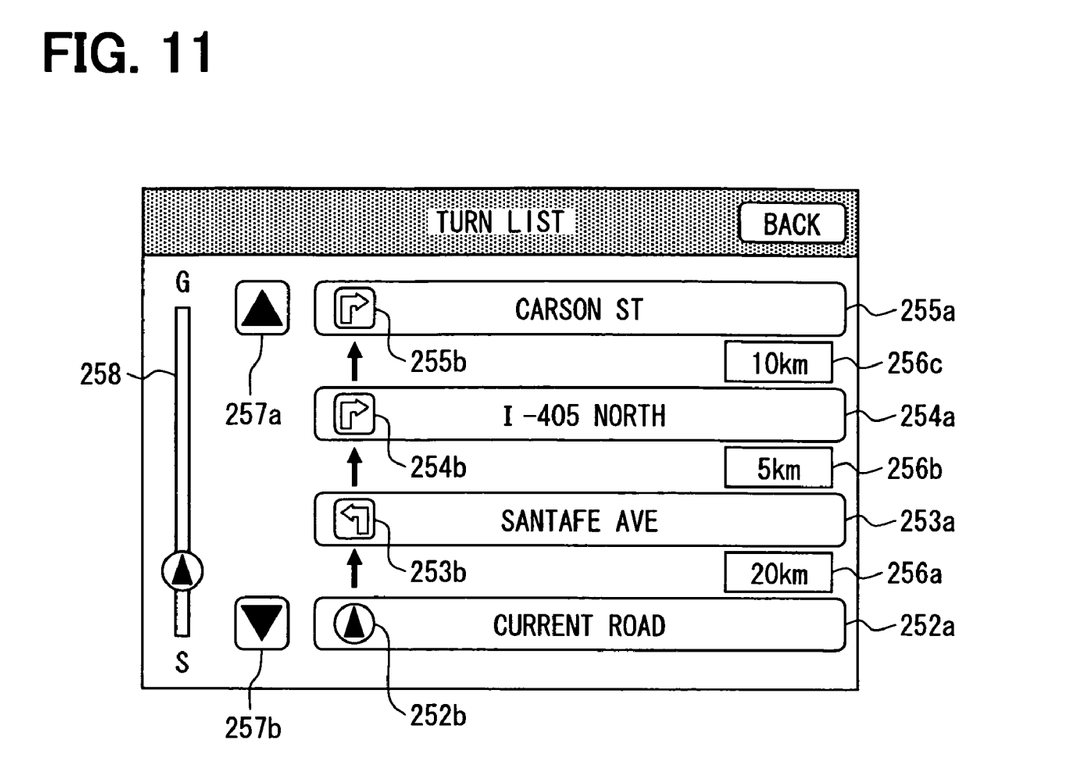
FIG. 11 is an illustration of an example of the display of the turn list.

As shown in FIG. 11, a current position mark 252*b* together with a road name "CURRENT ROAD" that is superposed on the position mark 252*b* for showing the currently traveled road name are displayed in a lower-most line of the screen. By using the "CURRENT ROAD" as a start point, various marks such as the branch points and the like is displayed as a list that extends upward toward the top of the screen in an order of the travel of the vehicle along the route. Arrow marks 253*b*, 254*b*, and 255*b* are marks to guide the traveling direction respectively at the branch points. Further, marks 253*a*, 254*a*, and 255*a* displayed superposingly on top of the respective arrow marks are marks that show road names after turning in the direction of the arrow at the respective branch points.

Further, an indicator 256*a* shows the distance along the route from the current position to the following branch point, and indicators 256*b* and 256*c* are indicators that respectively show the distances between corresponding branch points along the route.

The turn list in FIG. 11 only shows the three branch points from the current position. However, it is possible to scroll the list downward by pressing an icon 257*a* composed of the GUI "568 ", and to display information on the subsequent branch points in an order of traveling along the route. Further, it is possible to scroll back the list upward by pressing an icon 257*b* composed of the GUI "▼." However, it is assumed not to scroll back to the branch points before the current position.

Further, a gauge 258 that represents a degree of progress at the current position relative to the distance of the entire route to the destination is displayed on the left side of the screen.

The explanation goes back to the flow chart in FIG. 10. After starting the turn list display in S703, it is determined whether the current position has moved after the previous occasion of determination (S704). If the process determines that the current position has not moved (S704:NO), the process repeats the current determination. If the process determines that the current position has moved (S704:YES), the process determines whether the vehicle has reached the destination, or whether the vehicle has exited from the high-altitude area (S705). In this case, arrival to the destination is determined by the comparison between the coordinates of the destination and the coordinates of the current position, and exit from the high-altitude area is determined by the comparison of the coordinates of the current position with the high-altitude area data.

If it is determined that the vehicle has not yet reached the destination or that the vehicle has not exited from the high-altitude area in S705 (S705:NO), the process determines whether the next branch point has been passed (S706). The passage of the branch point is determined by the coordinates of the branch point and the coordinate of the current position. At the time of comparison, the determination of the passage is conducted in consideration of the error of the measurement of the position detector 21 for the precision of the determination. More practically, a precision dilution index (DOP) of the GPS receiver 21a and a user equivalent ranging error (UERE) are employed together with other indices to calculate the estimated position error (EPE) in the horizontal direction, and the passage of a certain branch point is confirmed when the EPE range around the current position coordinates includes the coordinates of the certain branch point. The EPE represents a range of the current position in consideration of the measurement error of the GPS system. Therefore, the inclusion of the next branch point in the EPE range is used for the determination of the passage of that branch point for the improvement of the precision of determination.

The process returns to S702 when it is determined that the next branch point has not been passed (S706:NO), and the distance from the current position to the next branch point is re-calculated. Then, based on the calculation result, the turn list having the updated indicator 256a showing the distance to the next branch point and the update indicator 258 showing the degree of progress relative to the entire route (See FIG. 11) is displayed (S703).

On the other hand, in S706, if the process determines that the next branch point has been passed (S706:YES), the process returns to S701 for setting the data of the subsequent branch point to be passed. Then, the information on the passed branch point and the passed inter-branch section is removed from the turn list, and the information on the subsequent branch points is re-arranged toward the top of the screen from the name of the currently traveling road at the bottom of the screen. In this manner, the contents of the turn list are updated (S703). In addition, the indicator for indicating the inter-branch distances in the subsequent sections as well as the progress indicator is updated in a timely manner.

As described above, the display of the turn list is updated one by one in a repeated manner according to the execution of the processing of S701-S706 as the vehicle travels along the route. The "Turn list display processing" is ended when the process determines in S705 that the vehicle has reached the destination, or that the vehicle has exited from the high-altitude area (S705:YES).

The following advantageous effects are achieved by the vehicular navigation apparatus 1 of the present embodiment.

(1) While the vehicle is traveling in the high-altitude area, the functional restriction due to the prohibition of the operation of the HDD 23 during the travel in the high-altitude area is compensated by displaying the turn list memorized in advance in the external memory 24 instead of providing the route guidance based on required data that is read on demand from the HDD 23.

(2) The cost increase due to the increase of the external memory 24 for the implementation of the function of the present invention is suppressed, because the volume of the turn list data stored in the external memory 24 is much smaller in comparison to the volume of the external memory 24 required to store the map data for the travel in the high-altitude area.

(3) The turn list display is at the user's disposal for convenience by having the inquiry message (FIG. 9) displayed for the user to choose from whether or not the turn list should be displayed in the "Guidance switch processing (Second embodiment)" in FIG. 8. Further, by displaying the explanation message that the HDD 23 can not be operated in the high-altitude area, the user's consent can be acquired in terms of switching the "Normal guidance processing" to the "Turn list display processing."

(4) The information on the subsequent travel from the current position is always updated for viewing by the user as the vehicle travels along the route. Therefore, the user can easily recognize up-to-the-moment information regarding the progress of the travel relative to the entire route, the turning direction at the subsequent branch point and the like.

4. Other Embodiments

Although the present invention has been fully described in connection with the preferred embodiment thereof with reference to the accompanying drawings, it is to be noted that various changes and modifications will become apparent to those skilled in the art.

For instance, in the guidance data acquisition for generating the turn list data in S57 of the "Routing processing" (See FIG. 5) of the above embodiments, only the guidance data regarding the branch points and the inter-branch paths in the route sections that pass the high-altitude area is acquired. However, the guidance data of the branch points and the inter-branch paths of the entire route may be read from the storage. Reading the guidance data of the entire route enables the display of the guidance information of not only the high-altitude area but also the area further ahead of the high-altitude area in the form of the turn list. That is, the user can have increased amount of information regarding the travel along the route.

Further, in the above embodiments, the inclusion of the current position in the high-altitude area is determined based on the comparison of the high-altitude area data in the external memory 24 with the current position. However, the altitude of the current position may be determined by, for example, using the three-dimensional measurement method utilizing the radio signal from the satellite through the GPS receiver 21a. The determined altitude by the three-dimensional GPS measurement may then be used to determine whether the current position of the vehicle is in the high-altitude area. Further, the pressure sensor may be employed for detecting the atmospheric pressure for determining the current altitude of the vehicle.

Such changes and modifications are to be understood as being within the scope of the present invention as defined by the appended claims.

What is claimed is:

1. A navigation apparatus having a hard disk drive as map data storage, wherein the apparatus calculates a route toward a destination and provides a route guidance based on the calculated route according to map data retrieved from the hard disk drive, wherein the apparatus includes a position detector for detecting a current vehicle position, and wherein the apparatus stops an operation of the hard disk drive upon determining that the current vehicle position is in a high-altitude area that is higher than a predetermined altitude based on a detection result of the position detector, the apparatus comprising:

an area data storage storing high-altitude area determination data that defines, in a coordinate plane, the high-altitude area and a non-high-altitude area for both of map coordinates in the map data and position coordinates of the current vehicle position based on the detection result of the position detector for a determination whether the current vehicle position is in the high-altitude area;

a list storage storing a branch list data;

a list generation unit reading a list display data from the map data in the hard disk drive and storing the list display data as the branch list data in the list storage, wherein the list generation unit compares the route toward the destination with the high-altitude area determination data in the area data storage, and wherein the list generation unit retrieves, from the map data, the list display data listing guidance information for a portion of the route that is at least in the high-altitude area in terms of branches and inter-branch sections in the route arranged according to a travel sequence of the route if the comparison of the route with the high-altitude area determination data shows that the route is at least partially included in the high-altitude area;

a high-alt area determination unit determining whether or not the current vehicle position is in the high-altitude area based on a comparison of the position coordinates with the high-altitude area determination data; and a display control unit displaying a branch list that is based on the branch list data stored in the list storage in place of providing the route guidance based on the map data retrieved from the hard disk drive while, in a course of route guidance toward the destination along the calculated route, the current vehicle position is determined to be in the high-altitude area by the high-alt area determination unit.

2. The navigation apparatus of claim 1, wherein the display control unit determines whether a branch in the branch list has been passed based on a transition of the current vehicle position detected by the position detector, the display control unit excludes information regarding a passed branch as well as preceding branches and inter-branch sections of the passed branch from the display of the branch list according to a progress of the travel sequence, and the display control unit adds, to the display of the branch list, guidance information regarding the branch list data representing branches and inter-branch sections that have not been passed and are not being displayed according to the travel sequence of the route.

3. The navigation apparatus of claim 2, wherein the display control unit determines the current vehicle position detected by the position detector as well as an estimation area that is estimated to include the current vehicle position based on a detection accuracy of a detection result of the position detector, and the display control unit determines that the branch has been passed when the branch enters the estimation area.

4. The navigation apparatus of claim 1 further comprising:

a notification unit for notifying a user in a vehicle of information; and an input unit for receiving an input from the user, wherein the display control unit controls the notification unit to notify the user of a message that inquires whether the user desires or not a display of the branch list when the vehicle enters the high-altitude area from an outside of the high-altitude area, and the display control unit displays the branch list based on the branch list data stored in the list storage when the user inputs an affirmative response from the input unit that allows the display of the branch list in response to the message.

5. The navigation apparatus of claim 1, wherein the list generation unit retrieves the branch list data of the branches and the inter-branch sections for an entire route of the calculated route from the map data in the hard disk drive when the calculated route toward the destination passes the high-altitude area, and stores the branch list data in the list storage.

6. A non-transitory computer readable media storing a computer program product for a navigation apparatus having a hard disk drive as map data storage, wherein the apparatus calculates a route toward a destination and provides a route guidance based on the calculated route according to map data retrieved from the hard disk drive, wherein the apparatus includes a position detector for detecting a current vehicle position, and wherein the apparatus stops an operation of the hard disk drive upon determining that the current vehicle position is in a high-altitude area that is higher than a predetermined altitude based on a detection result of the position detector, the computer program product comprising computer executable instructions that implement:

storing, in an area data storage, high-altitude area determination data that defines, in a coordinate plane, the high-altitude area and a non-high-altitude area for both of map coordinates in the map data and position coordinates of the current vehicle position based on the detection result of the position detector for a determination whether the current vehicle position is in the high-altitude area;

storing, in a list storage, a branch list data;

reading, in a list generation unit, a list display data from the map data in the hard disk drive and storing the list display data as the branch list data in the list storage, wherein the list generation unit compares the route toward the destination with the high-altitude area determination data in the area data storage, and wherein the list generation unit retrieves, from the map data, the list display data for listing guidance information for a portion of the route that is, at least in the high-altitude area in terms of branches and inter-branch sections in the route arranged according to a travel sequence of the route if the comparison of the route with the high-altitude area determination data shows that the route is at least partially included in the high-altitude area;

determining, in a high-alt area determination unit, whether or not the current vehicle position is in the high-altitude area based on a comparison of the position coordinates with the high-altitude area determination data; and displaying, in a display control unit, a branch list that is based on the branch list data stored in the list storage in place of providing the route guidance based on the map data retrieved from the hard disk drive while, in a course of route guidance toward the destination along the calculated route, the current vehicle position is determined to be in the high-altitude area by the high-alt area determination unit.

* * * * *